United States Patent
Katagiri

(10) Patent No.: US 9,329,787 B2
(45) Date of Patent: May 3, 2016

(54) ADAPTING TO PREDICTED CHANGES IN HOST TRANSMISSION RATES

(71) Applicant: International Business Machines Corporation, Armonk, NY (US)

(72) Inventor: Takashi Katagiri, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/681,390

(22) Filed: Apr. 8, 2015

(65) Prior Publication Data

US 2015/0309738 A1    Oct. 29, 2015

(30) Foreign Application Priority Data

Apr. 28, 2014  (JP) .................................. 2014-093106

(51) Int. Cl.

| | |
|---|---|
| *G11B 5/02* | (2006.01) |
| *G11B 27/36* | (2006.01) |
| *G11B 31/00* | (2006.01) |
| *G06F 3/06* | (2006.01) |
| *G11B 20/10* | (2006.01) |

(52) U.S. Cl.
CPC ............ *G06F 3/0613* (2013.01); *G06F 3/0656* (2013.01); *G06F 3/0682* (2013.01); *G11B 20/10527* (2013.01); *G11B 27/36* (2013.01); *G11B 2020/10685* (2013.01); *G11B 2020/10805* (2013.01)

(58) Field of Classification Search
CPC ............ G11B 5/012; G11B 5/00; G11B 5/02; G11B 27/18; G11B 27/34; G11B 220/90; G11B 15/52; G11B 15/467; G11B 21/083; G11B 20/10529; G11B 19/28; G11B 27/005; G11B 20/1403; G11B 27/24
USPC .................. 360/231, 25, 29, 31, 39, 55, 72.3, 360/73.12, 77.12, 78.07, 83; 369/47.29, 369/47.32, 47.33, 47.28
See application file for complete search history.

(56) References Cited

U.S. PATENT DOCUMENTS

2004/0179284 A1*  9/2004  Martin ............. G11B 20/00007
                                                                    360/8

FOREIGN PATENT DOCUMENTS

| JP | 05197502 A | 8/1993 |
|---|---|---|
| JP | 06149717 A | 5/1994 |
| JP | 07021786 A | 1/1995 |
| JP | 07210324 A | 8/1995 |

(Continued)

OTHER PUBLICATIONS

IBM Appendix P, List of IBM Patents or Patent Applications Treated as Related, 1 page.

(Continued)

*Primary Examiner* — Nabil Hindi
(74) *Attorney, Agent, or Firm* — James H. Mayfield; Noah A. Sharkan

(57) ABSTRACT

In one embodiment, a method is provided for adapting a host transfer rate between a host and a tape drive to a medium transfer rate between the tape drive and a tape. A data compression rate of untransferred data in a buffer of a tape drive is measured. A change in a future host transfer rate is predicated based on the measured compression rate. A host transfer rate between a host and the tape drive is adapted to a medium transfer rate between the tape drive and a tape, based on the predicted change.

15 Claims, 6 Drawing Sheets

(56) References Cited

FOREIGN PATENT DOCUMENTS

| | | |
|---|---|---|
| JP | 08339639 A | 12/1996 |
| JP | 10124955 A | 5/1998 |
| JP | 11066743 A | 3/1999 |
| JP | 11096622 A | 4/1999 |
| JP | 2000123473 A | 4/2000 |
| JP | 2001320669 A | 11/2001 |
| JP | 2002215516 A | 8/2002 |
| JP | 2004047008 A | 2/2004 |
| JP | 2004227676 A | 8/2004 |
| JP | 3726284 B2 | 12/2005 |
| JP | 2006024291 A | 1/2006 |
| JP | 2008281985 A | 11/2008 |
| JP | 2010113739 A | 5/2010 |
| JP | 4866412 B2 | 2/2012 |
| JP | 2012150663 A | 8/2012 |
| JP | 2013093084 A | 5/2013 |

OTHER PUBLICATIONS

"Method and Device for Adapting to Predicted Changes in Host Transmission Rates", Japanese Patent Application No. 2014-093106, pp. 1-24, filed on Apr. 28, 2014.

* cited by examiner

ADAPTING TO PREDICTED CHANGES IN HOST TRANSMISSION RATES

TECHNICAL FIELD

The present invention relates to techniques for adapting to predicted changes in a host transfer rate during reading and writing operations performed by a sequential access device.

More specifically, the present invention relates to a technique for adapting the host transfer rate between a host and a tape drive to the medium transfer rate between the tape drive and a tape.

BACKGROUND OF THE INVENTION

Tapes and tape media are sequential media that usually record data sequentially. A tape drive is a typical example of a sequential access device used to access tapes and tape media.

FIG. 1 is a block diagram showing a typical data flow when data is read from a tape drive. As shown in FIG. 1, a tape drive 10 reads and writes data to and from tape cartridge 20. The data read by the tape drive 10 is transferred to a host 30. Data read by a read/write head 14 is stored temporarily in a drive memory buffer 12. Compressed data read from the tape cartridge 20 is decompressed by a compress/decompress engine 42 and transferred to the host 30 via a host interface (I/F) 44.

FIGS. 2A and 2B are diagrams showing an example of a typical system, including the tape drive 10, a tape cartridge 20, the host 30, and a computer 50 (in FIG. 2B). As shown, the tape drive 10 is configured to detachably house an inserted (mounted) tape cartridge 20.

FIG. 3 is a diagram showing an example of a typical tape drive. The tape drive 10 writes data (e.g., user data) sent from the host 30 to a tape 23 and reads data from the tape 23 in fixed-length data sets (DS). These data sets (DS) are collections of data units and are written to the tape 23 with a fixed-length format configuration.

The tape drive 10 includes a drive memory buffer 12, a read/write channel 13, a read/write head 14, a motor 15, and a reel 22, around which tape 23 is wound. The tape drive 10 may have two motors 15.

The tape cartridge 20 is a medium cartridge housing tape 23 wound around a reel 21. The motor 15 rotates the reels 21 and 22. As the reels 21 and 22 are rotated, the tape 23 moves in the longitudinal direction of the tape from reel 21 towards reel 22 or, when moving in reverse, from reel 22 to reel 21. The tape 23 is a sequential medium and may be a tape medium other than magnetic tape. While the tape 23 is moving in the longitudinal direction, the read/write head 14 writes information to the tape 23 and reads information from the tape 23.

The tape drive 10 includes a read control (controller) 16, a head position control system 17, and a motor driver 18. The read control 16 controls the entire tape drive 10. The read control 16 performs controls in response to commands received from the host 30 to write data to the tape 23 and read data from the tape 23. The read control 16 controls the head position control system 17 and the motor driver 18, and performs back-hitching operations.

The data transferred via the read/write channel 13 is written by the read/write head 14 to the tape 23 in data set (DS) units. The host 30 issues (read/write) commands to the tape drive 10 to read and write data. The host 30 also issues (locate/space) commands to the tape drive 10 to indicate the locations of variable-length data.

The drive memory buffer 12 is memory used to store data to be written to the tape 23 and data read from the tape 23. The drive memory buffer 12 can be configured as dynamic random-access memory (DRAM). The drive memory buffer 12 includes a plurality of fixed-length segments. Each segment houses a data set (DS) which is the read/write unit for the tape 23. A single data set includes a plurality of data units sent from the host 30.

The tape drive 10 selects a tape speed so that the data rate at which data is transferred to the tape memory (the medium transfer rate) and the data rate at which data is transferred from the tape drive 10 to the host 30 (the host transfer rate) are as close as possible to the same transfer rate.

The tape speed is determined by the medium transfer rate. When the host transfer rate is greater than the medium transfer rate during reading, the drive memory buffer 12 inside the tape drive 10 becomes full.

When the drive memory buffer 12 is full, data read from the tape medium cannot be temporarily stored in the drive memory buffer 12, and back-hitching is performed to stop the tape 23. Data is transferred from the tape 23 to the drive memory buffer 12 once free space is again available in the drive memory buffer 12.

When the tape drive 10 temporarily stops the tape 23 (i.e., performs back-hitching), approximately three seconds of overhead can occur, for example. Therefore, attempts are made to match the host transfer rate with the medium transfer rate during reading so that the drive memory buffer 12 does not become full.

In an actual operating environment, the host transfer rate between the host 30 and tape drive 10 is always changing for a variety of system-based reasons. Even when the host 30 continues to read data at a fixed speed (i.e., even when the network transfer rate remains constant), the host transfer rate (2) measured by the tape drive 10 changes due to the data compression rate, because the data handled by the tape drive 10 is compressed.

For example, the data compression rate has to be taken into account during a data transfer where the tape drive 10 has alternately read 50 MB of uncompressed data and 50 MB of data compressed by 50%. Here, it is assumed that the network transfer rate is a constant 100 MB/sec. In order to keep the buffer in/out transfer rates approximate and prevent back-hitching, the medium transfer rate (3) is controlled so that the host transfer rate (2) is roughly equal to the medium transfer rate (3). When the network transfer rate is 100 MB/sec and the compression rate of the data is 50%, the host transfer rate is 50 MB/sec. When the data is not compressed, the network transfer rate and the host transfer rate are both 100 MB/sec.

For the sake of simplicity, an example method used to measure the host transfer rate may assume the following transfer rates: Transfer Rate A—the average transfer rate for the past 10 MB of data each time 10 MB of data has been transferred; Transfer Rate B—the average transfer rate for the past three minutes at Transfer Rate A; and Transfer Rate C—the average transfer rate measured after a transfer of 250 MB of data has been completed.

Transfer Rate C is the result of calculations performed after determining the type of average transfer rate, and cannot be used to control the tape speed (i.e., because it is not a value measured in real time). Therefore, the tape speed is controlled using Transfer Rate B, which is based on past history. Here, in order to simplify the calculation, a simple average is used. However, tape speed is actually controlled by obtaining the most recent host transfer rate using, for example, an FIR filter.

FIG. 4 is a diagram showing example transitions between transfer rate A and transfer rate B. For example, the host transfer rate B is 100 [MB/sec] when the transfer of 130 MB of data has been completed.

A tape speed (i.e., medium transfer rate) corresponding to 60 MB/sec is being used. At this time, the following can occur: (a) A medium transfer rate of 60 MB/sec is maintained, so the transfer rate may be lowered, but, if a transfer rate of 100 MB/sec continues, a bottleneck of 40 MB/sec (100 minus 60) continues to occur in the medium transfer rate; or (b) the medium transfer rate may be temporarily stopped by performing back-hitching so the tape can move faster (change to a medium transfer rate of 100 MB/sec), but, because of the back-hitching, the medium transfer is temporarily stopped. For this reason, the tape speed should not be changed unnecessarily in cases where the transfer rate may suddenly fall.

Here, a decision must be made whether to use (a) or (b). Even when Transfer Rate A or Transfer Rate B is used, the future cannot be known. Therefore, (b) is usually selected on the assumption that past history can be used (e.g., a transfer rate of 100 MB/sec has continued for more than a predetermined period of time) and that a transfer rate of 100 MB/sec is likely to continue.

However, good results may not be obtained where (b) is selected when a transfer of 130 MB of data has just been completed. A penalty is paid (i.e., back-hitching) when the transfer rate falls, so no advantage is gained by increasing the tape speed. However, (b) is typically selected anyway because it cannot be determined whether or not the transfer rate will fall from past history, after a transfer of 130 MB of data has just been completed.

SUMMARY

In one embodiment of the present invention, a method for adapting a host transfer rate between a host and a tape drive to a medium transfer rate between the tape drive and a tape is provided, the method comprising: measuring a data compression rate of untransferred data in a buffer of a tape drive; predicting a change in a future host transfer rate based on the measured compression rate; and adapting a host transfer rate between a host and the tape drive, to a medium transfer rate between the tape drive and a tape, based on the predicted change.

In another embodiment of the present invention, a tape drive for adapting a host transfer rate of a host to a medium transfer rate of a tape is provided, the tape drive being configured to: measure a data compression rate of untransferred data in a buffer of the tape drive; predict a change in a future host transfer rate based on the measured compression rate; and adapt a host transfer rate between a host and the tape drive to a medium transfer rate between the tape drive and a tape, based on the predicted change.

In another embodiment of the present invention, an apparatus is provided, comprising: a tape cartridge configured to write compression rate data to tape to enable adaption of a host transfer rate between a host and a tape drive to a medium transfer rate between the tape drive and the tape, wherein the tape cartridge is configured to enable a tape drive, when the tape cartridge is mounted in the tape drive, to write to the tape, as metadata, results of measuring a data compression rate of untransferred data in a buffer of the tape drive, and to read compression rate data from the tape, such that the tape drive can predict changes in a future host transfer rate and adapt the host transfer rate to the medium transfer rate based on the predicted change.

DETAILED DESCRIPTION

Figure 1:
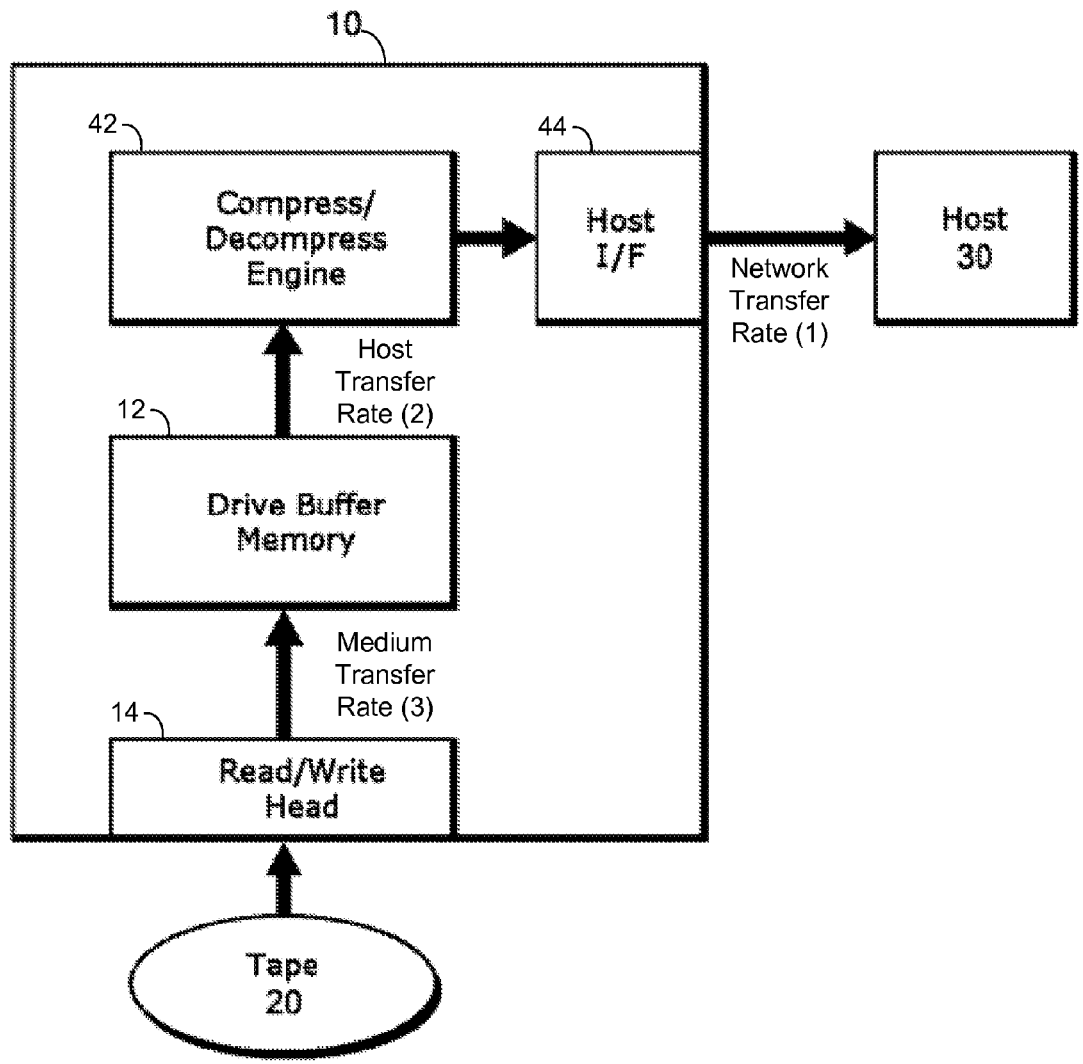
FIG. 1 is a block diagram showing a typical data flow when data is read from a tape drive.
Figure 2A:
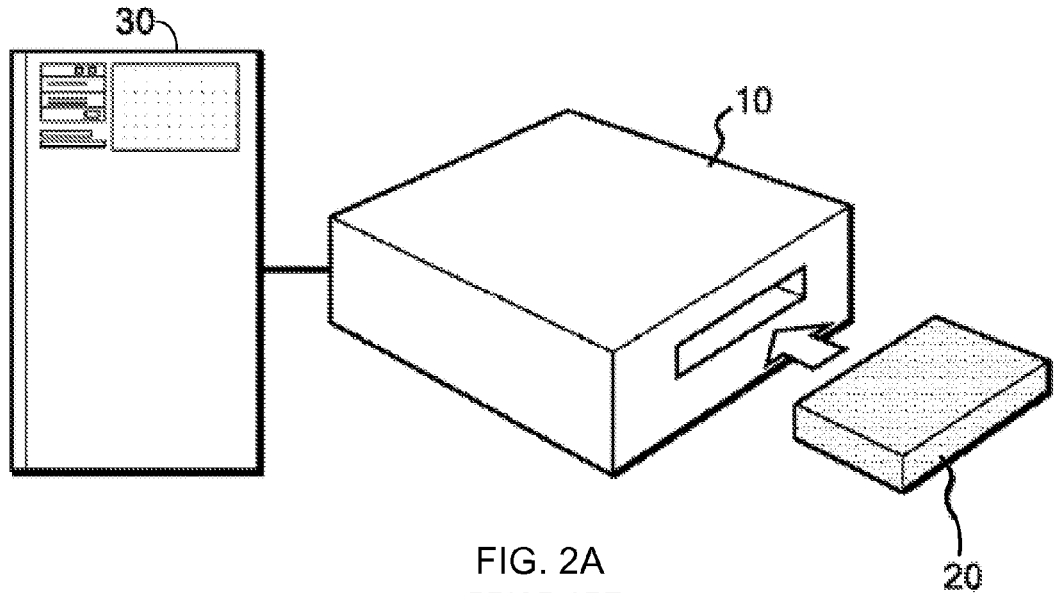
FIGS. 2A and 2B are diagrams showing an example of a typical system.
Figure 2B:
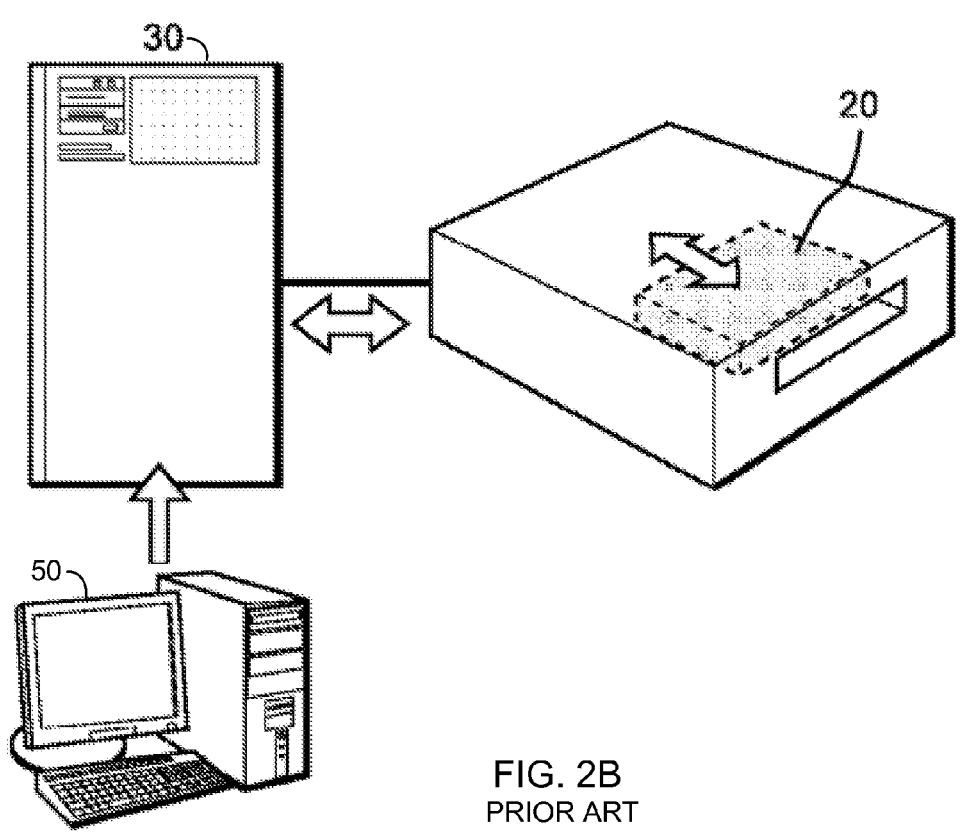
Figure 3:
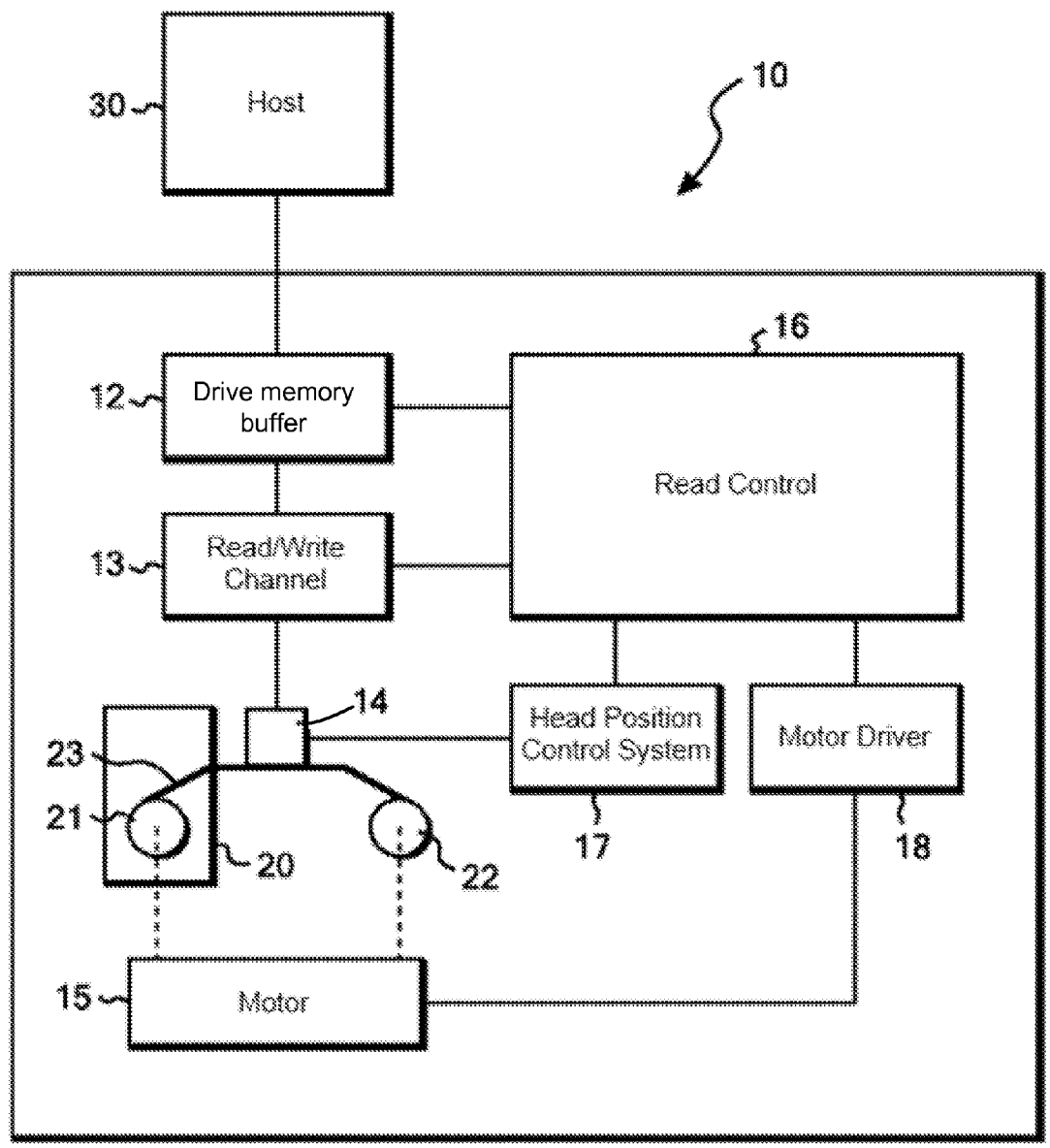
FIG. 3 is a diagram showing an example of a typical tape drive.
Figure 4:
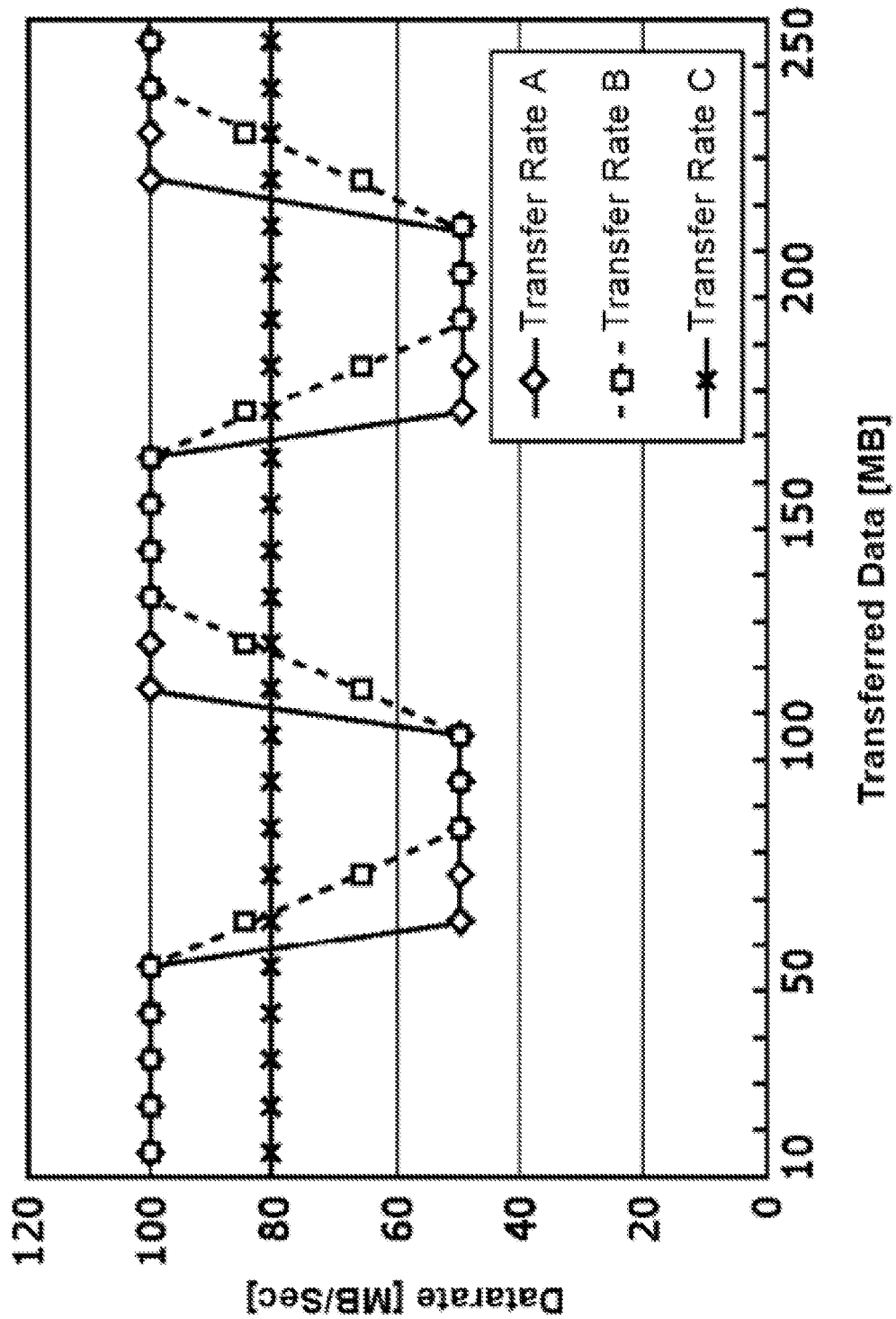
FIG. 4 is a diagram showing example transitions between transfer rates.

Embodiments of the present invention recognize a need to improve accuracy of future predictions of host transfer rates. Embodiments of the present invention take into account, when the medium transfer rate is lower than the host transfer rate, the data remaining in the buffer of a drive which has not yet been transferred to the host, and use the compression rate of this data to improve the accuracy of host transfer rate predictions. The compression rate of untransferred data in the buffer is measured, and the host transfer rate is corrected with respect to a sequential access device, such as a tape drive. Because the tape transfer rate (i.e., medium transfer rate) can be controlled using the host transfer rate, in which changes in the host transfer rate caused by compression rates have been absorbed, the host transfer rate can be used to reduce the frequency of unnecessary back-hitching.

The host transfer rate can be calculated in order to use future changes in the transfer rate because the maximum deviation in the average transfer rate is restrained using a known technique. This can be used to keep the buffer in the tape drive from becoming full. By using a host transfer rate with improved accuracy, unnecessary tape stoppage and attempts at selecting faster tape speeds can be eliminated.

Embodiments of the present invention recognize that in a typical method, previously discussed Transfer Rate A (i.e., the most recent momentary transfer rate) or Transfer Rate B (i.e., a transfer rate taking past history into account) is used. Transfer Rate A can be the average transfer rate for the past X MB of data each time X MB of data has been transferred. Transfer Rate B can be the average transfer rate for the past n minutes at Transfer Rate A. Transfer Rate C can be the average transfer rate measured after the transfer of all data has been completed.

When "deviation rate [%]=transfer rate X−Transfer Rate C/Transfer Rate C)*100" increases for Transfer Rate C, measured after long-term transmission, the buffer in the tape drive (e.g., tape drive 10) becomes full, and back-hitching occurs. Unnecessary back-hitching occurs in an effort to change the medium transfer rate, but the medium transfer rate remains slow and cannot follow the host transfer rate.

Embodiments of the present invention recognize that a solution to this problem is to allow for measurement of the host transfer rate, which has a lower deviation rate than Transfer Rate C.

Embodiments of the present invention provide a method in which the following new transfer rate, Transfer Rate D, is measured: Transfer Rate D=Transfer Rate B*(compression rate of Y MB of data to be transferred to the host/compression rate of most recent X MB of data).

The compression rate of Y MB of data to be transferred to the host (e.g., host 30) can be determined because the compression rate of each fixed quantity of data (for example, 10 MB) is written to the tape (e.g., tape 23) as metadata when data is written to the tape. When data is read from the tape, the tape drive can use this metadata before transferring the data.

This can be used when the data is read from the tape to the buffer (e.g., drive memory buffer 12).

Figure 5:
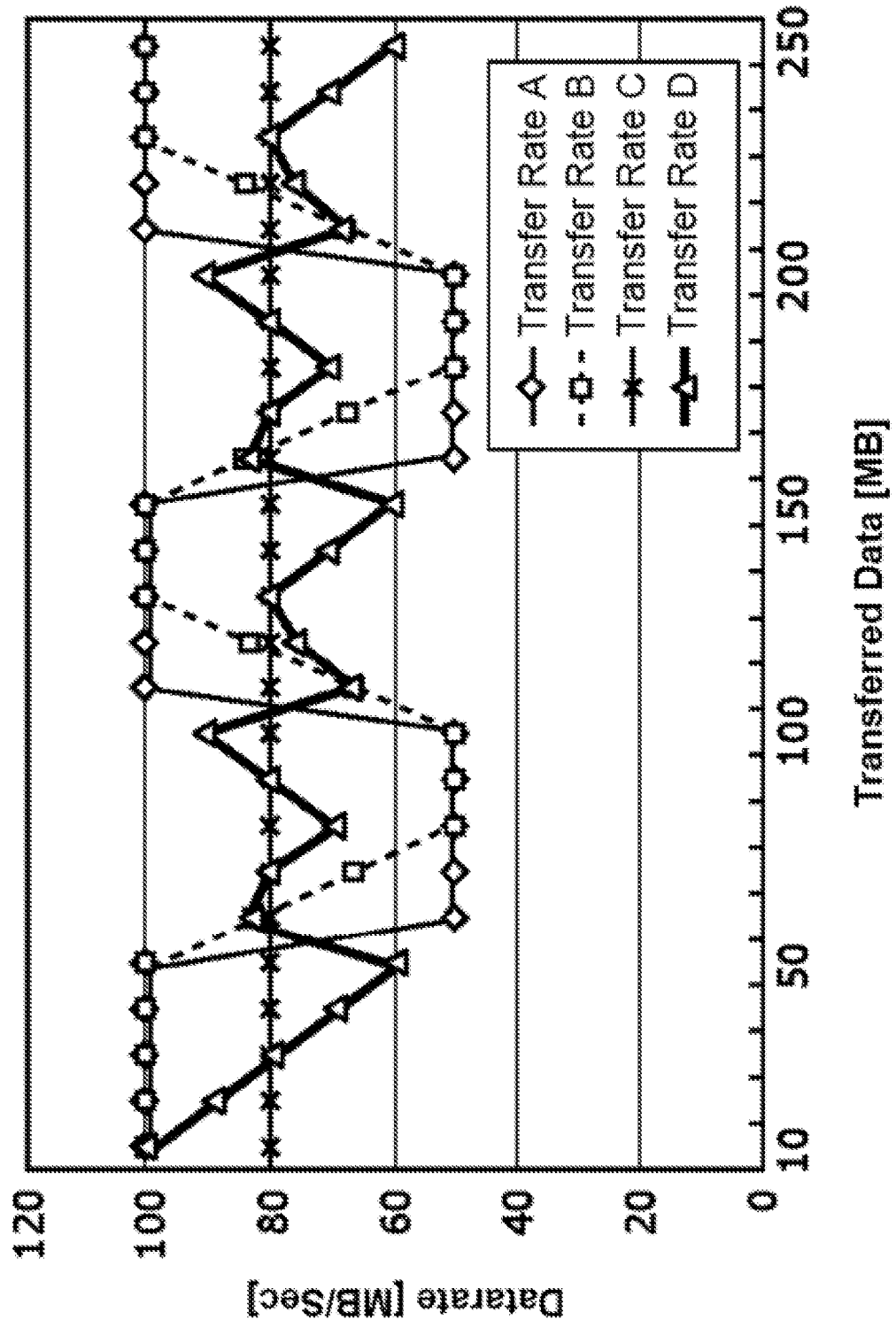
FIG. 5 is a diagram showing a comparison of transfer rates.

FIG. 5 is a diagram showing a comparison of transfer rates.

Figure 6:
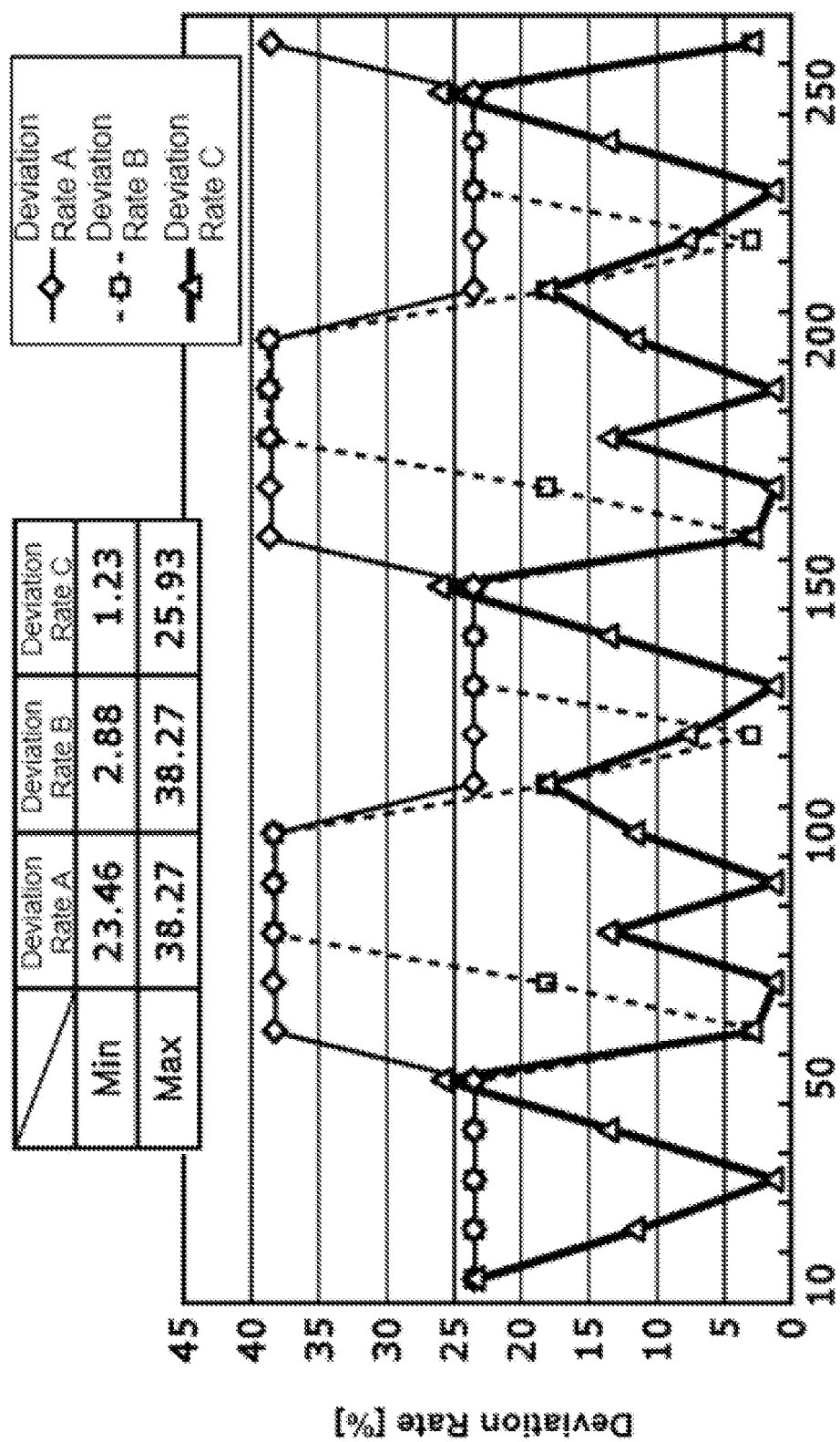
FIG. 6 is a diagram showing a comparison of rates of deviation.

FIG. 6 is a diagram showing a comparison of rates of deviation. Here, X=10 MB, n=3, and Y=50 MB. Because embodiments of the present invention take both past history and changes in future compression rates into account, Transfer Rate D has a smaller rate of deviation in comparison to other transfer rates than Transfer Rate C. As a result, a transfer rate with a lower rate of deviation can be measured, which is useful for controlling the medium transfer rate.

In the explanation provided above, a simple measurement model was used for Transfer Rate B. However, even when embodiments of the method use only past history, the rate of deviation in the long-term transfer rate can be reduced, and a better transfer rate for use in selecting the tape speed can be measured by taking into account future changes in the compression rate, as in Transfer Rate D.

What is claimed is:

1. A method for adapting a host transfer rate between a host and a tape drive to a medium transfer rate between the tape drive and a tape, the method comprising:
    measuring a data compression rate X of data recently transferred to a host;
    measuring a data compression rate Y of untransferred data in a buffer of a tape drive;
    measuring a historical transfer rate, wherein the historical transfer rate is an average data transfer rate over a period of time;
    estimating a future host transfer rate D based on the data compression rate Y and the data compression rate X; and
    adapting a host transfer rate between the host and the tape drive to a medium transfer rate between the tape drive and a tape, based on the future host transfer rate D.

2. The method according to claim 1, wherein estimating the future host transfer rate D is based on a most recently measured compression rate of untransferred data in the buffer of the tape drive.

3. The method according to claim 2, wherein estimating the future host transfer rate D is based on one or more transfer rates of data transfers performed over a prior period of time.

4. The method according to claim 3, wherein estimating the future host transfer rate D is based on reducing a rate of deviation in an average transfer rate of the data transfers performed over the prior period of time.

5. The method according to claim 1, further comprising:
    writing compression rate metadata for each fixed quantity of data to the tape; and
    writing the compression rate metadata from the tape to the buffer when a first portion of data is read from the tape and before the first portion of data is transferred to the host.

6. A tape drive for adapting a host transfer rate of a host to a medium transfer rate of a tape, the tape drive being configured to:
    measure a data compression rate X of data recently transferred to a host;
    measure a data compression rate Y of untransferred data in a buffer of the tape drive;
    measure a historical transfer rate, wherein the historical transfer rate is an average data transfer rate over a period of time;
    estimate a future host transfer rate D based on the data compression rate Y and the data compression rate X; and
    adapt a host transfer rate between the host and the tape drive to a medium transfer rate between the tape drive and a tape, based on the future host transfer rate D.

7. The tape drive according to claim 6, wherein the tape drive is configured to estimate the future host transfer rate based on a most recently measured compression rate of untransferred data in the buffer of the tape drive.

8. The tape drive according to claim 7, wherein the tape drive is configured to estimate the future host transfer rate D based on one or more transfer rates of data transfers performed over a prior period of time.

9. The tape drive according to claim 8, wherein the tape drive is configured to estimate the future host transfer rate based Don reducing a rate of deviation in an average transfer rate of the data transfers performed over the prior period of time.

10. The tape drive according to claim 6, wherein the tape drive is further configured to:
    write compression rate metadata for each fixed quantity of data to the tape; and
    write the compression rate metadata from the tape to the buffer when a first portion of data is read from the tape and before the first portion of data is transferred to the host.

11. The tape drive according to claim 9, wherein the tape drive is further configured to:
    write compression rate metadata for each fixed quantity of data to the tape; and
    write the compression rate metadata from the tape to the buffer when a first portion of data is read from the tape and before the first portion of data is transferred to the host.

12. An apparatus, comprising:
    a tape cartridge configured to write compression rate data to tape to enable adaption of a host transfer rate between a host and a tape drive, to a medium transfer rate between the tape drive and the tape,
    wherein the tape cartridge is configured to enable a tape drive, when the tape cartridge is mounted in the tape drive, to write to the tape, as metadata, results of measuring a data compression rate X of data recently transferred to a host, measuring a data compression rate Y of untransferred data in a buffer of the tape drive, measuring a historical transfer rate, wherein the historical transfer rate is an average data transfer rate over a period of time, and to read compression rate data from the tape, such that the tape drive can estimate a future host transfer rate D based on the data compression rate Y and the data compression rate X and adapt the host transfer rate to the medium transfer rate based on the future host transfer rate D.

13. The method of claim 1, wherein the future host transfer rate D is substantially equal to the historical transfer rate multiplied by the data compression rate Y divided by the data compression rate X.

14. The tape drive of claim 6, wherein the future host transfer rate D is substantially equal to the historical transfer rate multiplied by the data compression rate Y divided by the data compression rate X.

15. The apparatus of claim 12, wherein the future host transfer rate D is substantially equal to the historical transfer rate multiplied by the data compression rate Y divided by the data compression rate X.

* * * * *